United States Patent Office 2,719,496
Patented Oct. 4, 1955

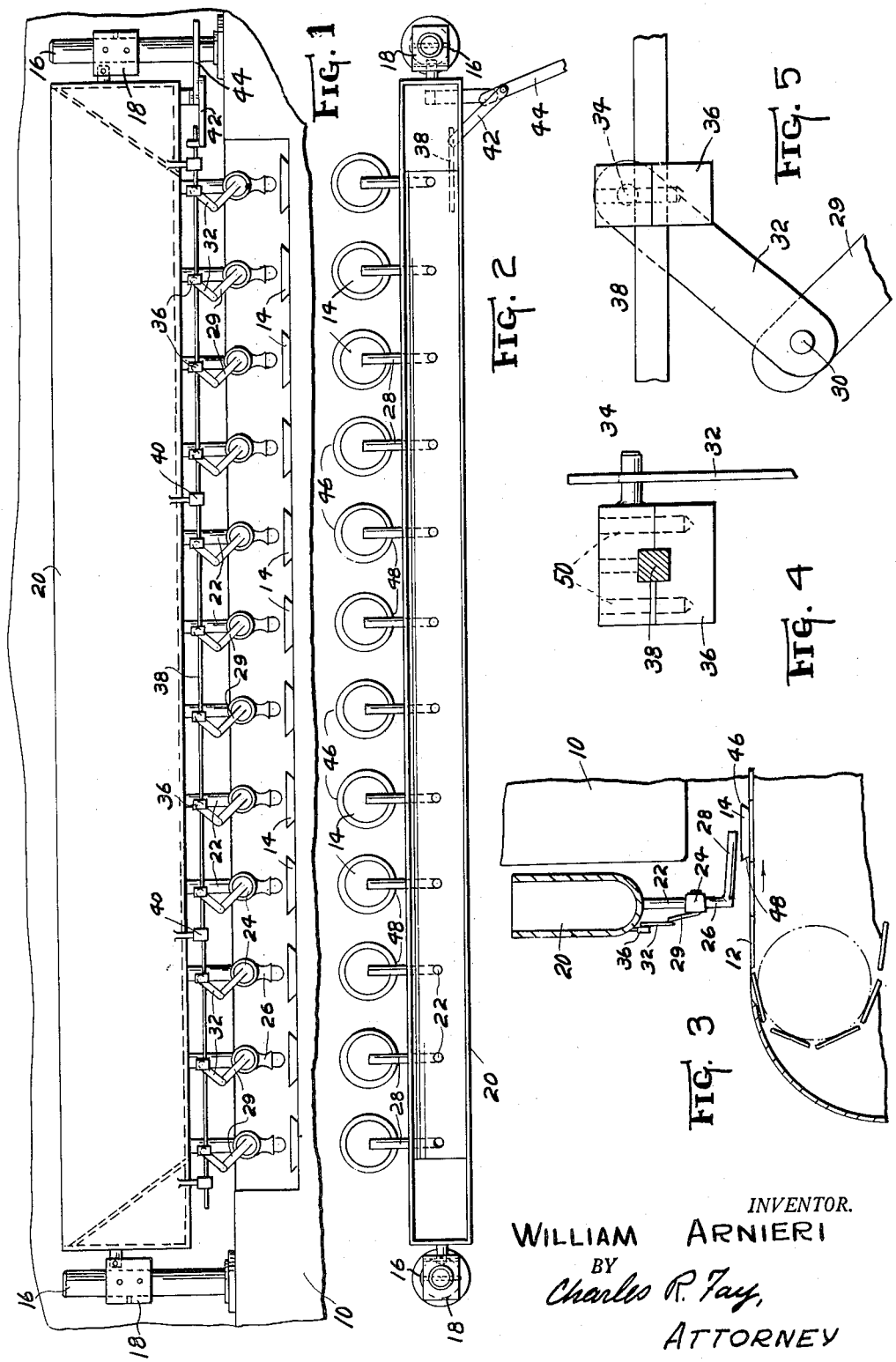

2,719,496

PIE FILLING MACHINE

William Arnieri, Worcester, Mass., assignor of one-half to Theodore Tonna, Worcester, Mass.

Application February 23, 1952, Serial No. 273,125

3 Claims. (Cl. 107—27)

This invention relates to a new and improved pie-filling machine and includes a conveyor associated with an oven, the conveyor carrying aligned rows or lines of pies into the oven to be baked, there being a reservoir for pie filling located just in front of the oven, the reservoir being provided with a series of spouts depending therefrom in position to discharge pie-filling material into the pie shells as the latter pass therebeneath, said spouts each having a valve and each valve being connected to a manually-actuated lever so that the operator of the machine opens all of the valves simultaneously just when the leading edges of the pie shells pass under the spouts, leaving the valves open until the trailing ends of the pie shells pass under the spouts, whereupon the operator closes the valves until the next row of pie shells approaches. By this means, the filling of the pie shells is completely under the control of the operator who can fill the shells to the degree desired, and also the operator can control the filling to render the pie shells filled uniformly, it being recognized that the pie shells are conventionally round and require a greater discharge of pie filling adjacent the centers thereof as compared with the leading and trailing ends.

Further objects of the invention include the provision of a machine as above described including a support for the reservoir for vertically adjusting the same and wherein all of the apparatus is mounted on the reservoir, the entire device, except for the supports, comprising a self-contained unit so that by adjusting the reservoir the spouts and actuators therefore are adjusted therewith.

A further object of the invention includes the machine above described including means for adjusting the range of operation of the valves since each valve per se is apt to open or close slightly differently from the others and clearly it is desirable that each pie shell be filled to the same degree as each other shell, this being impossible if the valves operate differently.

Other objects and advantages of the invention will appear hereinafter.

Reference is to be had to the accompanying drawings in which:

Fig. 1 is a view in elevation of the apparatus of the present invention with the oven being broken away;

Fig. 2 is a plan view thereof;

Fig. 3 is a view on an enlarged scale showing the reservoir in section;

Fig. 4 is a view on an enlarged scale showing the valve actuator mounting; and

Fig. 5 is a view in elevation of one of the valve actuators.

In carrying out the present invention, there is, of course, an oven 10 which forms no part of the present invention except that it supports the pie-filling machine. A conveyor 12 preferably of the endless type moves in the direction of the arrow in Fig. 3 carrying lines or rows of pie shells 14 into the oven. The pies are, of course, baked upon discharge from the oven. The pie shells are deposited in aligned rows on the conveyor 12 and pass slowly into the oven.

On suitable supports at the entrance of the oven there is provided a pair of vertical posts or standards 16 on which are mounted blocks 18 by any suitable means such as screws or pins, and these blocks support an elongated container 20 hereinafter referred to as reservoir for the pie-filling material. This reservoir is preferably made of sheet metal and is strong enough to be self-supporting throughout its length although separate supports may be provided if required. This reservoir is normally maintained substantially full of pie filling material by means of a pump or by any other means not shown, which may be found convenient.

Depending from the reservoir at the bottom thereof there is a series of aligned pipes 22. Each pipe is provided with a rotary type valve 24 and from this valve another pipe depends as at 26, this pipe having a substantially horizontal spout or nozzle 28, see Fig. 3. Nozzle 28 inclines downwardly slightly so that the pie-filling material will not tend to become clogged, but at the same time the pie-filling material is distributed therefrom into the pie shells in the direction of movement of the latter and it has been discovered that this insures a more even filling of the shells.

Each valve 24 is provided with a valve-operating arm 29 which upon being oscillated opens and closes the valve in a well-known manner. Each arm 29 is pivotally connected at 30 to an end of a link 32, the other end of which is pivoted on a pin 34 mounted on a clamp block 36. Each clamp block 36 is detachably secured to an elongated rod 38 that is longitudinally slidable in hangers 40 which depend from the reservoir 20.

At one end of the machine, the rod 38 is pivotally connected to a link 42 pivoted to a lever 44 under manual control of the operator so that by pivoting lever 44 the rod 38 is moved longitudinally, thus moving the links 32 and the valve arm to open and close the valves when required by the presence of the pie shells.

It is believed that the operation of the machine will be clearly apparent to those skilled in the art. When the leading edges 46 of a row or line of pie shells passes beneath the open ends of spouts 28, the operator moves lever 44 simultaneously opening all of the valves and starting to discharge pie filling at the leading edges of the shells.

Clearly, the discharge increases as the valves gradually open due to the viscous nature of the pie filler, thus helping to fill up the relatively large central parts of the pie shells. When a sufficient quantity of pie filling material is received in the pie shells, the operator starts to gradually close the valves by moving the lever 44 in the opposite direction, so that when the trailing edges 48 of the pie shells reach the open ends of spouts 28, the discharge has completely ceased. The pie filling material is somewhat fluid and tends to distribute itself evenly over the pie shells, but nevertheless it is important that the operator be able to control the discharge of the pie filling material in a manner other than automatic so that the discharge of filling material is always under control of the operator. In addition, the operator is enabled to actuate the valve control at the right time regardless of the distance between the lines of pie shells. That is, these distances vary, and automatic machinery cannot adjust itself to such a variation.

The valves 24 are commercial valves and when installed in the spouts do not always open and close simultaneously as is required by the nature of the machine. The blocks 36 may be loosened as by screws which may be placed in tapped holes 50, see Fig. 4, and the blocks 36 are thereupon movable on rod 38 so as to be adjustable and to adjust the opening and closing of each individual valve, whereby the operator is assured that the valves all operate exactly the same.

Having thus described my invention and the advantages thereof, I do not wish to be limited to the details herein disclosed otherwise than as set forth in the claims, but what I claim is:

1. A pie filling machine comprising an oven, means to advance a series of lines of pie shells to the oven, said means including a continuously traveling endless belt having a reach thereof carrying the pie shells directly into the oven, a reservoir for pie filling located above the said belt in front of the oven, a series of spouts mounted on and leading down from the reservoir into position just above the lines of pie shells, a valve in each spout, means to operate the valves simultaneously, manually operated and controlled means to actuate the valve operating means, said pie shells being filled to the desired degree just prior to entry thereof into the oven and regardless of the distance between the lines of pie shells, the valve operating means including an operator device for each valve, and an elongated rod to which the devices are connected, and said manually operated means including a lever pivoted to the rod to cause the latter to move longitudinally to actuate the devices simultaneously upon manual actuation of the lever by the operator of the machine, and means for adjusting the point of connection of each operator device to the rod to vary the range of valve operation of each valve for rendering the same uniform.

2. A pie filling machine comprising a conveyor for traveling lines of pie shells into and through an oven, said conveyor being horizontal and having an operating portion thereof passing through the oven, a reservoir for pie filling above the conveyor just prior to the entrance of the latter into the oven, a line of spouts depending from the reservoir, a valve in each spout, an elongated rod extending along the reservoir, a clamp block for each valve on the rod, a link pivoted to each block, an oscillatory arm on each valve, each link being pivoted to a respective arm to actuate the valves simultaneously upon longitudinal motion of the rod, and manual means under control of the machine operator to move the rod.

3. The machine of claim 2 wherein the clamp blocks are adjustably clamped to the rod and vary the range of opening and closing of the individual valves by varying the initial position of each valve operating arm.

References Cited in the file of this patent

UNITED STATES PATENTS

| | | |
|---|---|---|
| 538,941 | Wolven | May 7, 1895 |
| 695,365 | Ayars | Mar. 11, 1902 |
| 744,048 | Cerruti | Nov. 17, 1903 |
| 765,552 | Bucklin | July 19, 1904 |
| 996,646 | Jackson et al. | July 4, 1911 |
| 1,483,643 | Palmer et al. | Feb. 12, 1924 |
| 1,740,032 | Pecard | Dec. 17, 1929 |